Nov. 5, 1929.  H. KREISINGER  1,734,677
AIR WASHER
Filed Dec. 4, 1925  2 Sheets-Sheet 2
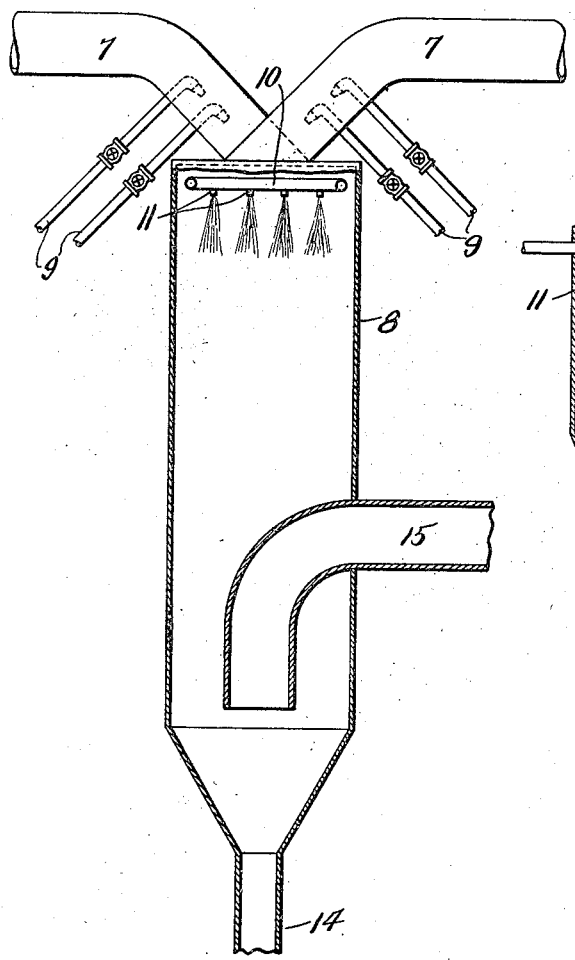
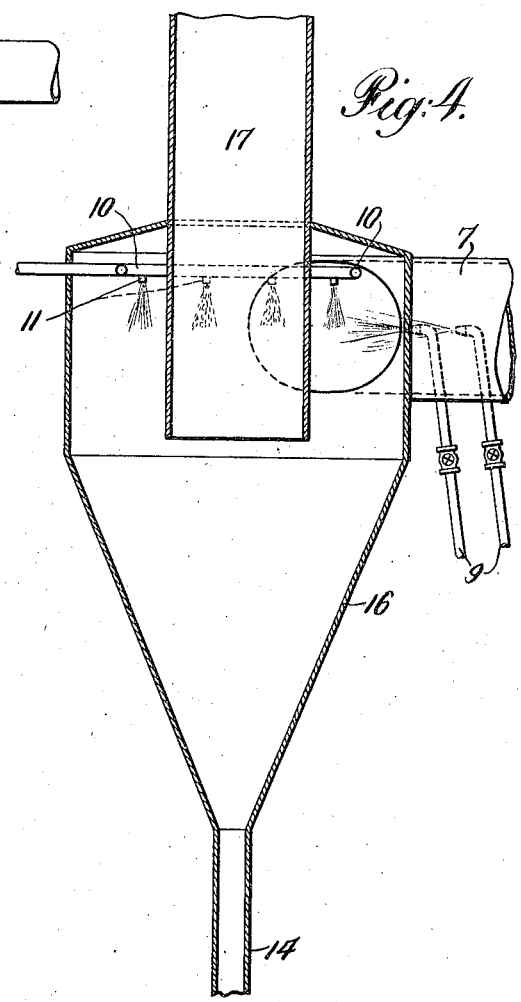
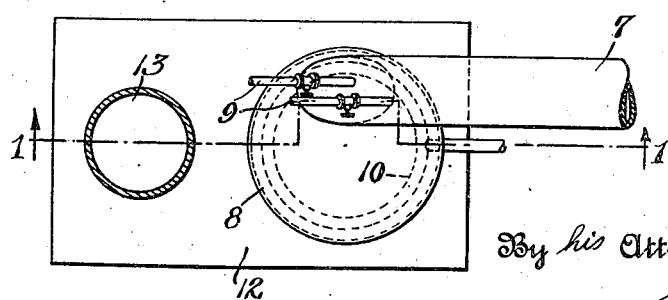
Inventor
Henry Kreisinger
By his Attorneys
Symestvedt & Lechner Patented Nov. 5, 1929

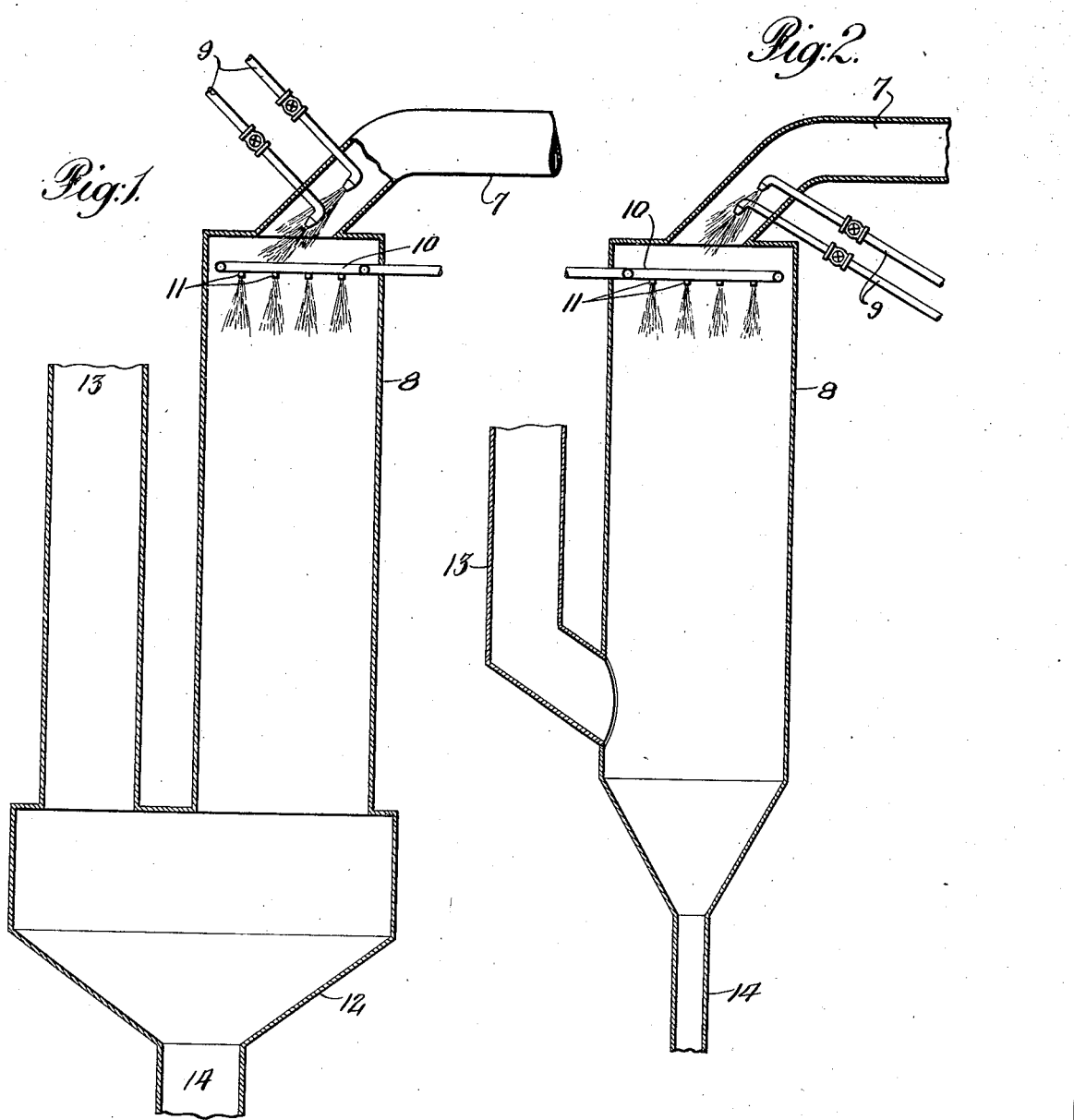

1,734,677

UNITED STATES PATENT OFFICE

HENRY KREISINGER, OF PIERMONT, NEW YORK, ASSIGNOR TO INTERNATIONAL COMBUSTION ENGINEERING CORPORATION, OF NEW YORK, N. Y., A CORPORATION OF DELAWARE

AIR WASHER

Application filed December 4, 1925. Serial No. 73,111.

This invention relates to air washers and it is especially useful for removing dust from gases from coal driers, from the air vented from air separation mills for pulverizing coal, and the like. The problem of dust in pulverized coal preparing, handling and burning installations is quite a troublesome one and my invention is most useful in this connection.
The primary object of the invention is to produce a simple and effective means whereby the air, and/or gas are effectively cleaned or washed of dust.

The foregoing, together with such other objects as may hereinafter appear, or are incident to my invention, I obtain by means of a construction as I have illustrated in preferred form in the accompanying drawings, wherein Fig. 1 is a vertical section thru the washer embodying my improvements taken on line 1—1 of Figure 5;

Figs. 2, 3 and 4 are, respectively, similar sectional views illustrating modifications of the invention; and Figure 5 is a plan view of the washer shown in Figure 1.

Referring now to Fig. 1, the dusty gas (air, waste gas or the like) is conducted by the pipe 7 to the chamber 8. Immediately in advance of its entrance into the chamber 8, the dusty gas is subjected to the action of one or more steam jets 9, which project within the pipe 7 and are adapted to shoot jets of steam in the direction of the travel of the gas. The object of introducing steam is to supply water in its final state of sub-division, steam being nothing but water in which the individual molecules are moving freely in the space. The finest water spray that can be made contains globules of water which contain thousands of these molecules so that the finest spray of water is far too coarse as compared with steam.
At the top of the chamber 8 is a water spray produced by the annular pipe ring 10, which is provided with a plurality of downwardly directed jets 11. The purpose of the water spray injected into the mixture of dust and steam, is to cool the steam and bring it below the point of condensation. The cooled steam condenses on the particles of dust, thus greatly adding to their weight. This added weight, plus the particles from suspension, causes them to deposit at the bottom or on the side walls of the air washer. For purposes of collection of the sludge the bottom of the chamber 8 will be formed into a hopper shaped settling portion 12 from the upper part of which the washed gas is conducted by means of the conduit 13.

Water spray, even when fine like mist, is too coarse to accomplish the desired results, for the globules of water forming the mist are too heavy as compared to the particles of dust which are to be removed. The particles of dust seem to dodge these globules of water and pass thru the water spray without being wetted and removed. By using steam in the manner described these difficulties seem to be obviated and an effective washing is obtained. The amount of steam used in the washer is small, about 1 pound of steam being required for every two or three thousand cubic feet of air. The amount of water required is about 1 pound to every 200 cubic feet of air.

While I have described the two jets 9 as being steam jets, I may prefer to have the first jet a steam jet, and the second jet a water spray. These jets in addition to the functions already described act as injectors to assist in moving the gases to be washed thru the system.

The discharge end of the pipe 7 is disposed at an angle of about 90 degrees and is preferably set off center with respect to the top of the mixing and condensing chamber 8 so as to produce a helical motion of the mixture gas, dust, steam and water spray, as this mixture moves thru the mixing and condensing chamber. By virtue of this helical motion, the wetted particles are thrown against the surface of the mixing chamber and the water from the spray hopper washes them down into a settling or sludge hopper 12. The water and dust leave the washer thru the discharge outlet 14.

The arrangement of Fig. 2 is substantially the same as that already described with the exception that no separate settling chamber, as such, is provided. In the arrangement of Fig. 3, two pipes 7 are employed in order to obtain a more effective helical or whirling motion of the steam gas and water spray. As in the arrangement of Fig. 2, no separate settling chamber, as such, is provided. The clean gases are centrally taken out from the lower portion of the mixing chamber and condensing chamber 8 by means of the elbow-like pipe 15.

Referring now to Fig. 4, I employ a cyclone separator 16 for the mixing and condensing chamber, the pipe 7 with its jets 9 discharging into the cyclone separator in a manner so as to set up a whirling motion. The clean gases, according to this arrangement, are withdrawn upwardly thru a pipe 17 and the pipe ring 10 surrounds the pipe 17 and discharges the jets with water downwardly thereabout. The water and dust are withdrawn from the bottom of the cyclone separator.

What I claim is:

A gas washing apparatus including a chamber, a pipe for the gas to be washed discharging the said gas tangentially into the upper part of said chamber, a steam jet in said pipe adjacent the point at which it discharges into the chamber, said steam jet also being positioned to direct the steam tangentially into the chamber whereby a whirling movement is set up in the entering gas and steam, means for condensing the steam within the chamber comprising a water spray in the chamber adjacent the point at which the steam and gas are discharged thereinto, and adapted to spray the walls of said chamber, a settling portion in the lower part of said chamber and an outlet pipe for the washed gas.

In testimony whereof, I have hereunto signed my name.

HENRY KREISINGER.